No. 684,639. Patented Oct. 15, 1901.
C. HEART.
WHEEL.
(Application filed Nov. 20, 1900.)
(No Model.)
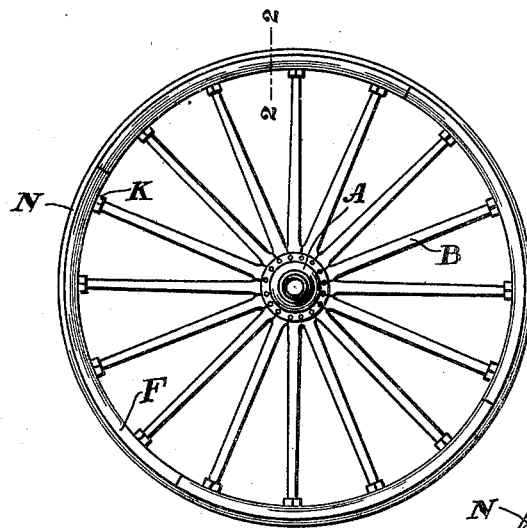
Fig. 1.
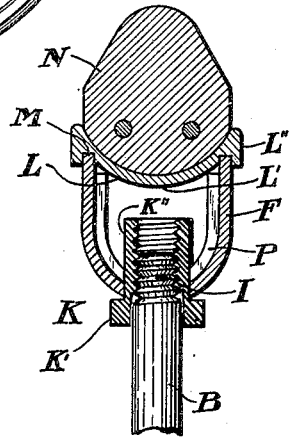
Fig. 2.
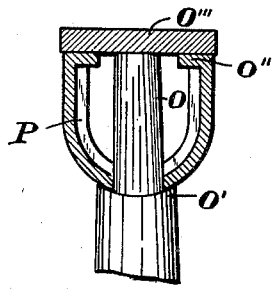
Fig. 5.
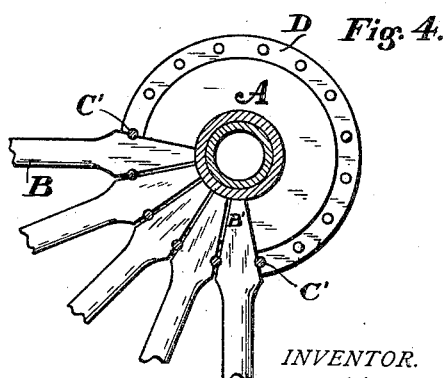
Fig. 3.
Fig. 4.
WITNESSES:
Thomas L. Ryan
Wm. A. Thornburg
INVENTOR.
Charles Heart
BY
W. DuVal Brown
ATTORNEY.
THE NORRIS PETERS CO., PHOTO-LITHO., WASHINGTON, D. C.

UNITED STATES PATENT OFFICE.

CHARLES HEART, OF FRANKTON, INDIANA.

WHEEL.

SPECIFICATION forming part of Letters Patent No. 684,639, dated October 15, 1901.

Application filed November 20, 1900. Serial No. 37,113. (No model.)

*To all whom it may concern:*

Be it known that I, CHARLES HEART, a citizen of the United States, and a resident of Frankton, in the county of Madison and State of Indiana, have invented a new and useful Wheel, of which the following is a specification.

The aim and purpose of this invention is to construct a wheel made wholly of metal.

A further object is to construct a wheel which will be light and at the same time strong enough to withstand all wear and tear and ordinary usage.

Another object of this invention is to construct a wheel wherein the parts can be easily assembled and firmly secured together after being assembled.

A still further purpose is to construct the wheel with means so that a rubber tire can be secured thereon, if thought desirable.

These and other objects not hereinbefore mentioned are accomplished by the construction illustrated in the accompanying drawings, wherein like letters of reference indicate corresponding parts in the several views, and in which—

Figure 1 is a side elevation of my improved wheel. Fig. 2 is a section through the felly, rim, and tire on the line 2 2, Fig. 1, and showing the upper end of one spoke. Fig. 3 is a detail perspective view of the lower end of one of the spokes. Fig. 4 is a section through the hub, showing the manner of securing the inner ends of the spokes in place; and Fig. 5 is a sectional view of a modified form of rim or felly with a tire shrunk thereon.

In the drawings, A designates the hub. The hub is the same in construction as that shown in my pending application for a patent for a wheel-hub filed October 15, 1900, Serial No. 33,078, so that a detailed description of it will not be necessary in this application.

B designates the spokes. The inner ends of the spokes are formed wedge shape, as shown more plainly at B', Fig. 4. These spokes are provided with a transverse groove C, through which the bolts C' pass. The ends of these securing-bolts C' are secured to the flanges D on the hub. The meeting faces of the inner ends of these spokes are formed with longitudinal corrugations E, so that when the spokes are in position in the hub these corrugations will mesh with each other and prevent the spokes from having any lateral play.

F designates the felly. I prefer to make the felly in four sections; but I do not desire to limit myself to this number, as it is evident that the number of the sections could be either increased or diminished. As plainly shown in Fig. 2, this felly is U-shaped in cross-section and is hollowed out, so as to lighten its weight. The upper ends of the spokes are screw-threaded, as shown at I, the screw-threaded portion extending up within the felly. Surrounding the screw-threaded portion of the spoke is a nut K, having an interior screw-thread meshing with the thread on the spoke. This nut is provided with a shoulder K' on the outside of the felly and a flange K'', extending up within the felly. The flange is of sufficent length so as to make the nut have quite a bearing on the end of the spoke. By this construction all the threads can be concealed by the surrounding nut, thereby giving the wheel a very finished appearance. As plainly shown in Fig. 2, the only portion visible of the locking means between the end of the spoke and felly will be the squared shouldered portion K' of the nut.

Resting on the upper edges of the felly is a rim L. This rim is a continuous circular piece of metal and is provided with a bow-shape portion L', located between the sides of the felly and the shoulders L'' on the outside of the sides of the felly to firmly lock the rim in position on the felly. The upper edges of the fellys are formed with a flat surface, as shown at M, Fig. 2, and the portion of the rim which rests upon this flat surface is also formed flat and horizontal, so that there will be formed a complementary bearing-surface between the rim and upper edges of the felly, which will be flat and at right angles to the longitudinal axis of the spokes. By this construction there will always be a firm tight joint between the parts, and the felly can be pressed into shape without having to have its upper edge beveled, and the rim can be also pressed into shape, thereby lessening the cost of construction, but at the same time making a tight even joint.

On the rim, as shown in Fig. 2, I secure a rubber tire N. This tire can be of the ordinary rubber-tire construction and can be secured to the rim with cement or other suitable means, the object of the rim being to prevent the ends of the spokes from coming in contact with the tire and puncturing the same.

In assembling the parts the sections of the fellies are first placed on the outer ends of the spokes and after the spokes have been secured to the hub. The continuous rim is then placed over the sections of the felly, and the nuts are then turned, forcing the sections of the felly outwardly, and thereby tightening the rim in place.

In Fig. 5 I show a modification wherein the nuts are dispensed with, and the ends of the spokes have a reduced portion O, extending within the felly o, and a shoulder O' on the outside of the felly, upon which the felly rests. In this construction the upper edges of the felly are bent inwardly, forming flanges O'', on which is shrunk an ordinary flat metallic tire O'''. I also in this construction make the spoke of sufficient length so that the end of the same will bear against the inner sufaco of the tire to strengthen the same.

P designates an inside clip between the joints of the felly for strengthening the same and preventing any lateral movement at the joints. I use this inside clip in both constructions.

I am aware that many minor changes can be made in the construction and arrangement of parts without in the least departing from the nature and principles of my invention.

Having thus described my invention, what I claim as new, and desire to secure by Letters Patent, is—

1. In a wheel, the combination with a metallic felly pressed into a substantially U-shaped form in cross-section, of spokes extending into the interior of the felly, the ends of the spokes within the felly being provided with exterior screw-threads, a nut on the outside of the felly adapted to bear against the lower portion of the felly surrounding the spokes and extending below the screw-threads, and an annular flange on the nuts provided with a smooth outer surface extending into the interior of the felly and also provided with the interior screw-threads which engage the threads on the ends of the spokes.

2. In a wheel, the combination with a sectional felly pressed into a substantially U-shaped form in cross-section, of a continuous independent U-shaped rim in cross-section resting on the outer edges of the felly, the outer edges of the felly and the meeting-points on the rim being formed horizontal and complementary, a shoulder on the rim bearing against the outside of the felly, spokes extending into the interior of the felly, the ends of the spokes being out of contact with the rim, and means for securing the spokes to the felly and forcing the felly outward toward the continuous rim.

In testimony whereof I have hereunto set my hand in the presence of two witnesses.

CHARLES HEART.

Witnesses:
W. PECK,
G. O. ELLISON.